United States Patent [19]
Carter

[11] 3,717,239
[45] Feb. 20, 1973

[54] CONTAINER HANDLING APPARATUS

[75] Inventor: Sidney T. Carter, Shrewsbury, Mass.

[73] Assignee: ATO Inc., Cleveland, Ohio

[22] Filed: Nov. 16, 1971

[21] Appl. No.: 199,295

[52] U.S. Cl. ............................................. 198/31 AA
[51] Int. Cl. ............................................. B65g 47/26
[58] Field of Search ................... 198/25, 31 AA, 103

[56] References Cited

UNITED STATES PATENTS

2,829,757   4/1958   Breeback .................... 198/31 AA

Primary Examiner—Edward A. Sroka
Attorney—Robert T. Gammons et al.

[57] ABSTRACT

Double discharge conveyor apparatus comprising spaced parallel discharge conveyors arranged to receive containers from a line conveyor, divide them into two rows and deliver them to a work table or tables in the form of a single broad conveyor or two narrow conveyors for inspection. A selector associated with the discharge conveyors alternately transfers one container from the line conveyor onto one of the discharge conveyors and the next onto the other of the discharge conveyors and at the same time rotates the latter containers approximately 180° so that the containers are delivered to the inspection conveyor or conveyors back to back with their labeled sides facing outwardly. The selector effects the division and orientation without interruption of the flow of the containers and is designed so that by the simple expedient of substituting one operating part for another is capable of processing containers of all sizes and cross-section.

48 Claims, 15 Drawing Figures

CONTAINER HANDLING APPARATUS

BACKGROUND OF THE INVENTION

Current labeling machines operate at such high speed that it becomes difficult to inspect the labeled containers as they leave the machine, and although devices for dividing a single row of containers into two or more rows are available such devices interfere with continuous flow of the containers thereby reducing efficient processing; require duplication of operations such as respotting and are incapable of processing all kind of containers regardless of size and/or cross-section. The device herein illustrated is designed to effect division of a single row of containers into two rows with the containers in each row facing outwardly, that is, the labeled sides facing outwardly to facilitate inspection, to effect such division without interfering with continuous flow of containers and hence without reduction in the output and to enable processing containers of all kinds regardless of size and/or cross-section.

SUMMARY

As herein illustrated, the apparatus is designed to divide a single row of containers without interruption of continuous flow into two rows and for disposing the containers in the two rows with the corresponding sides facing outwardly for ease of inspection and comprises a pair of discharge conveyors arranged with their ends adjacent an end of a line conveyor along which a single row of containers is travelling from, for example, a label-applying apparatus toward a work table or tables in the form of a single broad conveyor or two narrow conveyors onto which the end of which each discharge conveyor leads. There is a selector associated with the discharge conveyors comprising longitudinally disposed, oppositely turning rotors, one of the rotors having parts thereon movable from the far side of the line conveyor transversely onto the discharge conveyor at the near side and the other having parts thereon movable from the near side of the line conveyor transversely onto the discharge conveyor at the far side. Certain of the parts on the one rotor operate to intercept containers on the line conveyor and move them therefrom onto the discharge conveyor at the near side and others of the parts on the one rotor operate to intercept containers on the line conveyor and guide them therealong with the line conveyor to a position of interception by parts on the other rotor. The intercepted containers are moved from their positions of interception by the parts on the other rotor from the line conveyor to the discharge conveyor at the far side. The parts on the one rotor are alternately fixed with respect to the axis of rotation of the rotor and rotatable about axis spaced from and parallel thereto and comprise alternate, radially disposed, long and short arms. The long arms operate as they move near the line conveyor to intercept containers thereon and move them bodily in an arc onto the discharge conveyor at the near side, disposed in positions in which the label-bearing sides face outwardly. The short arms of the one rotor and the arms on the other rotor in combination operate as they guide the containers along the line conveyor and move them from the line conveyor to the discharge conveyor at the far side to turn the containers about their axis to positions in which the label-bearing sides face outwardly of the discharge conveyor at the far side. As required, the arms are provided with members of a relatively high coefficient of friction for engagement with the containers to prevent rotation thereof relative to the arms and are of a configuration to accept the cross-section of the containers. The discharge conveyors are arranged to deliver the containers to a single broad conveyor or two narrow conveyors constituting the work table or tables for inspection and such other operations as are desired. There are guides provided along the opposite sides of the discharge conveyors for guiding containers delivered thereto by the rotors and these guides extend continuously along the discharge conveyors to the place of transfer from the discharge conveyors to the inspection table or tables. When the discharge conveyors lead into a single broad conveyor there are cross-over devices for moving the containers from the discharge conveyors onto the inspection conveyor. The cross-over devices may function in the processing of containers of circular cross-section to effect orientation of the containers. When the discharge conveyors have extensions comprising the inspection conveyors the cross-over devices are omitted for all containers which are non-circular in cross-section.

The invention will now be described in greater detail with reference to the accompanying drawings wherein.

Referring to the drawings (FIGS. 1 and 3), there is shown at the left-hand side of each figure a line conveyor 10 which may be a continuation of the conveyor at the delivery end of a labeling machine, or the line conveyor by means of which containers are moved along relative to a machine such as shown in my pending application Ser. No. 78,652, filed Oct. 7, 1970 for applying sealing strips to the tops of containers.

Figures 1, 2:
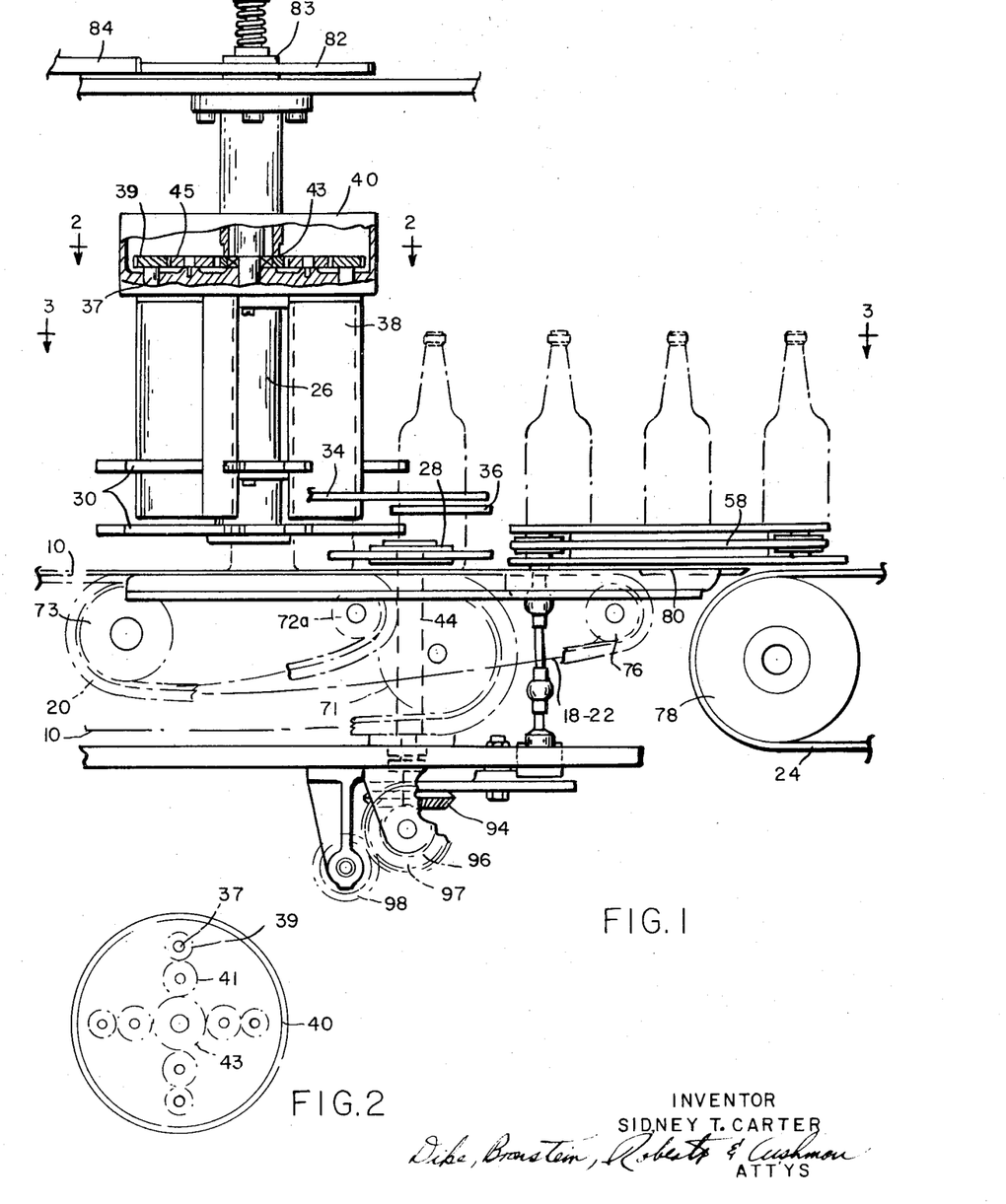
FIG. 1 is a fragmentary elevation of the apparatus showing a portion of the conveyor on which the containers are delivered from, for example, a labeling machine to the device herein illustrated for separating the single row into two rows, one row on each of two discharge conveyors which, in turn, deliver the containers to one or more conveyors for inspection.
FIG. 2 is a horizontal view taken on the line 2—2 of FIG. 1.
Figure 3:
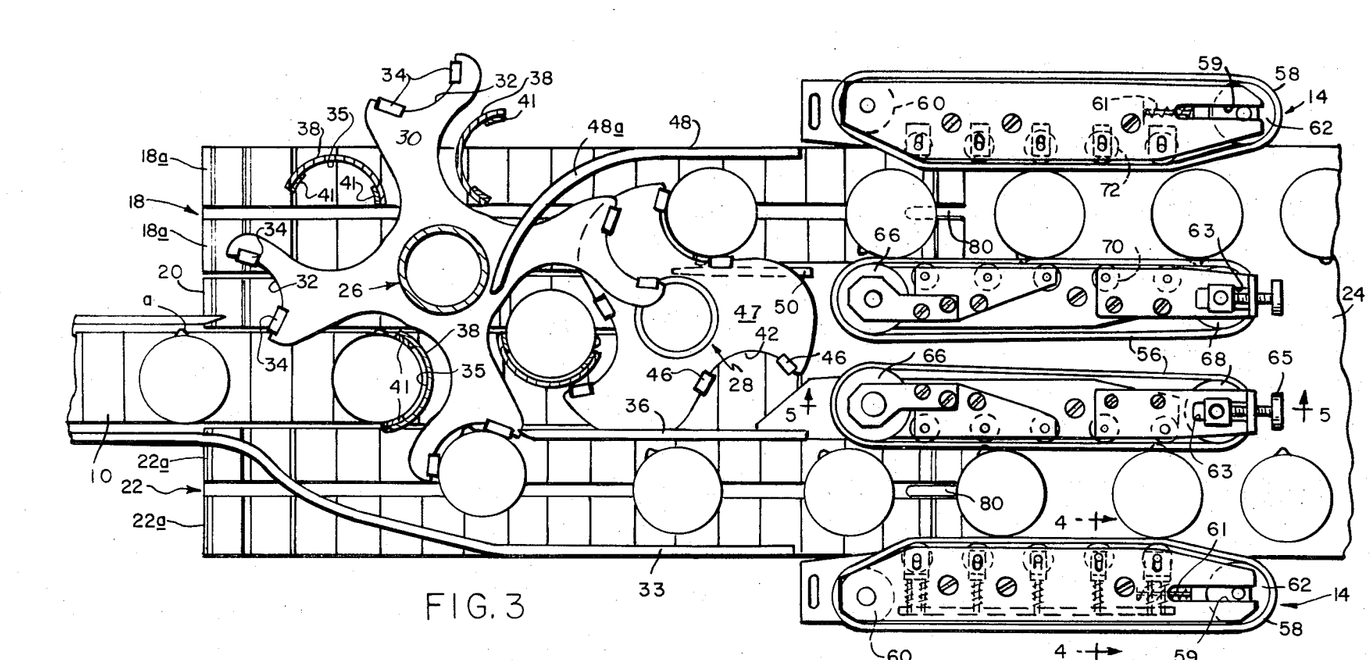
FIG. 3 is a plan view taken on the line 3—3 of FIG. 1 showing a single broad conveyor into which the discharge conveyors lead and cross-over devices which may function as spotters.

The containers moving along the line conveyor 10 are arranged in a single row in spaced relation and in a predetermined position of orientation (all facing in the same direction) which was imparted to the containers by spotting means in the labeling machine and is continued through the machine for applying sealing strips, the purpose of which is to insure application of the labels to the sides of the containers at a predetermined position and the sealing strips to the tops of the containers in a predetermined relation to the labels.

According to this invention the single row of containers is divided into two rows on spaced parallel discharge conveyors which, in turn, deliver the two rows back-to-back to a work area for inspection and certain other hand operations such as applying tax stamps and sales tags or for special packaging and the like. The work area may be a single broad inspection conveyor into which the discharge conveyors lead or two narrow inspection conveyors comprising continuous extensions of discharge conveyors. When the work area is a single broad inspection conveyor there are dead plates at the junction of the discharge conveyors with the broad inspection conveyor and cross-over devices operable to carry the containers from the discharge conveyors over the dead plates onto the broad inspection conveyor. These cross-over devices may also function as spotters as they transfer the containers from the discharge conveyors onto the single broad inspection conveyor. If the work area is comprised of two narrow inspection conveyors neither the dead plates nor the cross-over devices are required. However, since all round containers require a small amount of correction it is desirable to use the cross-over devices in conjunction with the two narrow inspection conveyors to effect the desired orientation of the round containers. The division of the single row of containers into two rows on two spaced discharge conveyors and from thence to the work area whether a single broad inspection conveyor or two narrow inspection conveyors is accomplished, as will appear hereinafter, without interfering with the continuous flow of the containers and with a reduction in the rate of travel of the containers thereby facilitating inspection and such other operations in the work area as required.

FIG. 3 is a plan view illustrating the provision of two discharge conveyors 18 and 22 leading into a single, broad conveyor 24 with dead plates 80 and cross-over devices 14 which also function as spotters. Intermediate the line conveyor 10 on which the containers are arranged in spaced relation and the discharge conveyor 18, there is a cross-over conveyor 20. Intermediate the ends of the discharge conveyors there are selector means for transferring containers from the line conveyor 10 to first one and then the other of the discharge conveyors 18 and 22. The selector means comprise two rotors 26 and 28 which, in cooperation, divide the row of containers delivered thereto by the line conveyor into two rows, one to each of the discharge conveyors 18 and 22 at approximately the same spacing as they had on the line conveyor 10 where they travel at about half the speed since the discharge conveyors 18 and 22 are driven at the same rate — approximately one half the speed of the line conveyor 10.

The upper surface of the line conveyor 10 and the surfaces of the conveyors 18, 20 and 22 all lie in a common horizontal plane so that the containers can be moved longitudinally and laterally from one conveyor surface to another by simply sliding them along the surfaces without lifting them.

The two rotors 26 and 28 are disposed in longitudinally spaced relation in the direction of longitudinal movement of the conveyors for rotation about vertical axis and are rotated in opposite directions — the rotor 26 in a counterclockwise direction and the rotor 28 in a clockwise direction.

Figure 11:
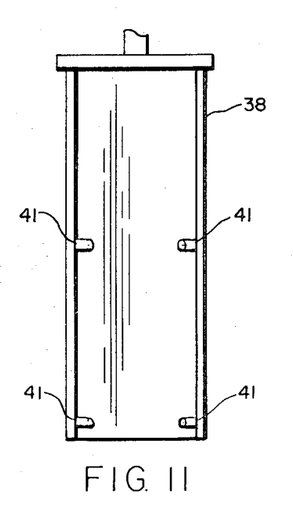
FIG. 11 is an elevation of one of the short arms of the rotor shown in FIG. 10 taken on the line 11-11.

The rotor 26 has fixed to it in vertically spaced parallel relation two sets of radially disposed arms 30, there being four such arms in each set, at the outer ends of which there are recesses or pockets 32 of a configuration to receive the containers being processed. At opposite sides of the recesses 32 there are resilient bumper blocks 34—34 of a material having a relatively high coefficient of friction with minimum spring-back or bounce to absorb shock as the arms intercept the containers and to resist rotation of the containers relative to the arms as they are moved about the axis of rotation of the rotor by rotation of the rotor. The two sets of radial arms 30 are vertically spaced so that there are four bumper blocks which engage the sides of the containers above and below mid-height. There are also on the rotor 26 intermediate the arms 30, arms 38 comprising pockets 35 which are supported on the rotor 26 by a hub 40 at a radial distance from the axis of rotation of the rotor. The arms 38 (FIG. 11) are vertically elongate, semicylindrical structures, extend downwardly from the hub 40 between the arms 30 of the upper set of arms 30 to a level just above the lower set of arms, as shown in FIG. 1, and are concave-convex in horizontal section. At opposite sides of the pockets 35 there are vertically spaced bumper blocks 41—41 situated approximately 150° apart comprised of the same material as the bumper blocks 34. If the spacing of the bumper blocks were 90° or less the containers would not always rotate with the rotors; hence the preferred spacing of 150°. The hub 40 is fixed to the rotor 26 and supports peripherally of the rotor vertically mounted shafts 37, to the lower ends of which the arms 38 are fixed. Each shaft 37 has on it a gear 39 and these mesh with idler gears 45 which, in turn, mesh with a gear 43 fixed to the rotor. Rotation of the rotor 26 thus turns the arms 38 in a clockwise direction about the axis of the rotor 26 as a center and rotates each arm 38 in a clockwise direction about its own axis as a center. The effective radius of movement of the arms 38 about the axis of the rotor is less than that of the arms 30 and hence the arms 38 will be referred to upon appropriate occasion as the "short arms" in distinction to the arms 30 which will be referred to as the "long arms".

Figure 10:
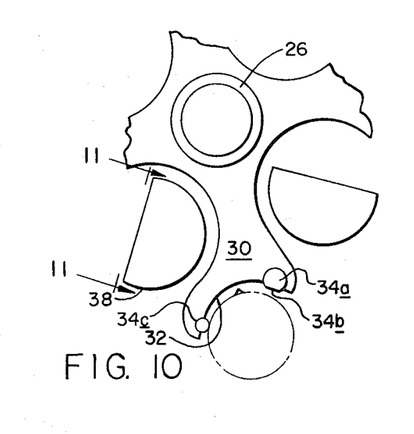
FIG. 10 is a fragmentary plan view of the first rotor of the pair of rotors shown in FIG. 3 provided with modified bumpers.

The bumper blocks provided in the long arms 30, as shown in FIG. 3, are rectangular in cross-section; however, these may desirably be of the shape shown in FIG. 10 wherein the bumper block 34a at the leading side of the recess is in the form of a cylinder slabbed off at the inner side to provide a flat surface 34b and the bumper at the trailing side of the recess is in the form of a cylinder 34c but is of smaller diameter than the bumper 34a.

The rotor 28 has three radially disposed arms 47, all of the same length containing recesses or pockets 42 and is supported from below the conveyors on a vertically disposed shaft 44 for rotation in a clockwise direction which is opposite to that of the rotation of the rotor 26. The opposite sides of the pockets 42 of the rotor 28 are also provided with bumper blocks 46—46 of the same material as that of the blocks in the rotor 26 to insure movement of the containers with the rotor without rotation relative thereto and with little springback or bounce to absorb the shock as the arms 47 intercept the containers. The preferred spacing for the bumper blocks 46—46 is on an arc of approximately 120°.

Figure 15:
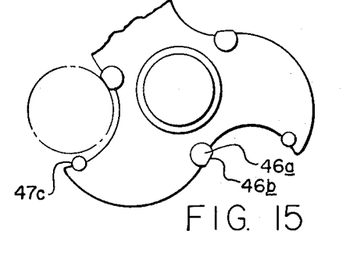
FIG. 15 is a plan view of the second rotor of the pair of rotors shown in FIG. 3 provided with modified bumpers.

The bumper blocks provided on the arms 47, as shown in FIG. 3, are rectangular in cross-section; however these may desirably be of the shape shown in FIG. 15 wherein the bumper blocks 46a at the roots of the arms are in the form of cylinders slabbed off at the inner sides to provide flat surfaces 46b and the bumpers at the distal ends of the arms are in the form of a cylinder 47c but of smaller diameter than the bumpers 47a.

The rotors 26 and 28 are supported at the far side of the line conveyor 10 so that rotation of the rotor 26 moves the arms 30 and 38 at the rear side of the rotor with respect to the direction of movement of the conveyors toward the line conveyor and rotation of the rotor 28 moves the arms 47 at the rear side away from the line conveyor. The arms 30 of the rotor 26 are of such length and so spaced that as they cross the line conveyor they intercept every other container and move it laterally and forwardly from the line conveyor 10 onto the discharge conveyor 22, the latter being provided at its opposite sides with guide rails 33 and 36. The guide rails 33 may comprise a continuation of the guide at the corresponding side of the line conveyor 10, crosses the conveyor 22 diagonally, skirting the rotor 26 and extends along the near side in the direction of movement of the conveyor. The guide rail 36 extends from a point intermediate the centers of rotation of the rotors along the far side of the discharge conveyor 22 in the direction of movement of the conveyors. To minimize frictional resistance to movement of the containers between the guide rails the inner surfaces are lined with a friction-reducing material. The arms 38 are of shorter length so that as they move about the axis of the rotor 26 from the conveyors 18 and 20 to the line conveyor 10 where they intercept the intermediate containers they guide the latter along the line conveyor 10 to a place of interception by the arms of the rotor 28.

The arms 47 of the rotor 28 are of a length such that as they cross the line conveyor 10 toward the discharge conveyor 20 they intercept the containers moved forwardly along the line conveyor by the arms 38 and move them across the intermediate conveyor 20 onto the discharge conveyor 18. Guide rails 48 and 50 at opposite sides of the discharge conveyor 18 serve to insure delivery of the containers in the direction of movement of the discharge conveyor 18. The guide rail 48 has a portion 48a which commences at the far side of the line conveyor intermediate the rotors, skirts the rotor 28, crosses the discharge conveyor 18 diagonally to the far side and extends therealong in the direction of movement of the discharge conveyor 18. The guide rail 50 is straight and extends along the near side of the discharge conveyor 18 from approximately the center of rotation of the rotor 28 in the direction of movement of the discharge conveyor 18. To minimize friction the surfaces of the guide rails 48 and 50 are lined with a friction-reducing material.

As related above, the conveyors 18, 20 and 22 travel at a slower rate than the line conveyor 10. The rotor 26 is rotated at a rate such that when the arms 30 and 38 intercept containers on the line conveyor 10 the latter holds the containers engaged with the arms until they are removed therefrom. The arms 30 thus operate to push the containers laterally and forwardly from the line conveyor 10 onto the discharge conveyor 22 and the arms 38 guide the containers along the line conveyor 10 to the place of interception with the arms of the rotor 28. As soon as the arms 30 travel forwardly of the line of center of rotation of the rotor 26 the discharge conveyor 22, by reason of the fact that it is moving at a faster rate than are the arms 30 at this position, takes the containers away from the arms, moving them forwardly in the direction of movement of the discharge conveyor 22. The rotor 28 is rotated in synchronism with the rotor 26 so that at the place of interception the arms 38 are in a position to permit the arms 47 to pick the containers from the arms 38 and move them from the line conveyor 10 across the intermediate conveyor 20 onto the discharge conveyor 18. The discharge conveyor 18 at the forward side of the center of rotation of the rotor 28 in the direction of movement of the conveyors is moving faster than the arms 47 at this position and so takes the containers away from the arms 47 and moves them along in the direction of movement of the discharge conveyors 18.

The intermediate conveyor 20 which is situated between the line conveyor 10 and the discharge conveyor 18 serves to hold the containers in the pockets 42 of the rotor 28 as they are moved from the arms 38 around the rear side of the rotor 28 with respect to the direction of movement of the conveyors. If the forward movement of the conveyors and the rotation of the rotors are carefully adjusted the guide rail 48 could be dispensed with.

Figure 6:
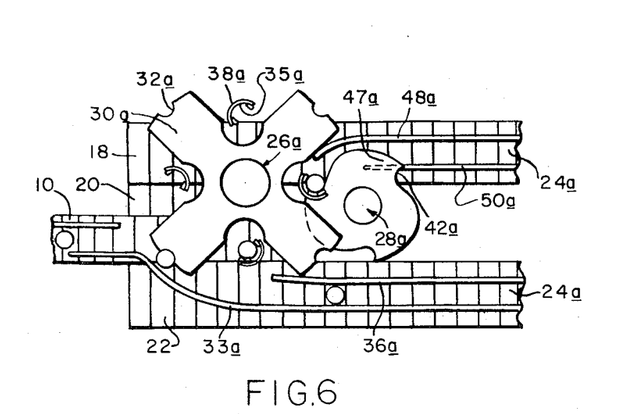
FIG. 6 is a plan view similar to FIG. 3 showing modifications for processing containers in the form of miniature bottles of round cross-section and showing two narrow inspection conveyors, one at the end of each of the discharge conveyors.

The arms 30, 38 and 47 carried by the rotors 26 and 28, as shown in FIG. 3, are designed especially for containers in the form of bottles of circular cross-section. For containers in the form of miniature bottles of circular cross-section the arms are modified as shown in FIG. 6. As there shown the rotors 26a and 28a are provided with radially disposed arms 30a, 38a and 47a containing pockets 32a, 35a and 42a of a reduced size such as to accommodate the much smaller miniature size bottles. Because of the much smaller diameter of these miniature bottles the guide rails 33a, 36a and 48a, 50a are placed closer to provide a narrow path for movement of the bottles along the respective conveyors.

Figure 7:
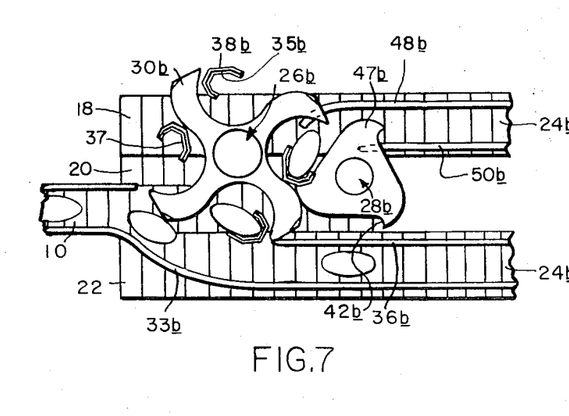
FIG. 7 is a plan view of the apparatus modified to process containers in the form of bottles of elliptical cross-section showing two narrow conveyors, one at the end of each discharge conveyor.
Figure 12:
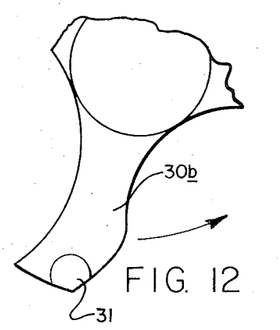
FIG. 12 is a plan view of a modified form of one of the long arms to much larger scale of the first rotor of the pair of rotors shown in FIG. 7.
Figure 13:
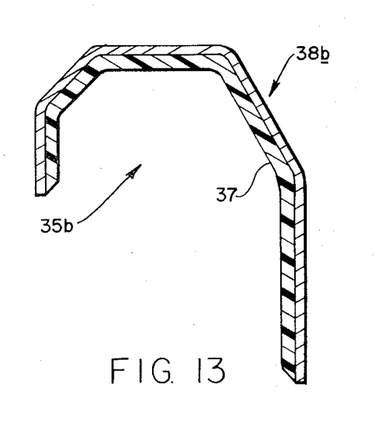
FIG. 13 is a section of a modified form of the short arm such as shown in FIG. 7.
Figure 14:
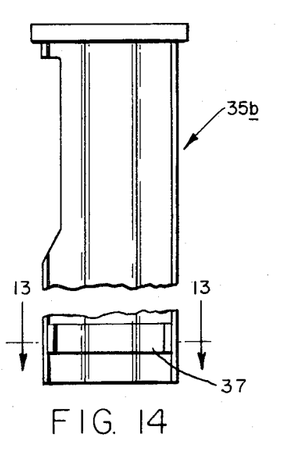
FIG. 14 is an elevation of the short arm shown in FIG. 7.

By substitution of appropriately shaped rotors the apparatus is adapted to handle containers in the form of flask-type bottles of elliptical shape as well as round bottles. Thus, as shown in FIG. 7, the rotor 26b has radial arms 30b with blunt ends which operate to push the bottles laterally and forwardly from the line conveyor 10 onto the discharge conveyor 22. The blunt ends of the arms 30b are provided, as shown in FIG. 12, with inserts 31 comprised of the same material as the aforementioned bumpers. The inserts are set into the leading sides of the arms with reference to their direction of rotation at the intersection of the sides with the ends and are slabbed off to conform to the surface configuration at the sides and ends. The arms 38b which are elongate concavo-convex structures have relatively deep pockets 35b (FIGS. 13 and 14) of polygonal cross-section, with one side substantially longer than the other so as to engage one of the narrow sides of the bottle and a substantial part of one of the broad sides to enable rotating the bottles about their own centers. The inner surfaces of the structures are provided near their lower ends with a narrow strip 37 of frictional material (FIG. 13). The rotor 28b has arms 47b containing shallow pockets 42b of arcuate shape designed to engage the narrow sides of the bottles to remove them from the arms 38b. Since the bottles are substantially narrower in width than the diameters of the bottles shown in FIG. 3, the guide rails 33b, 36b and 48b, 50b are placed closer together.

Figure 8:
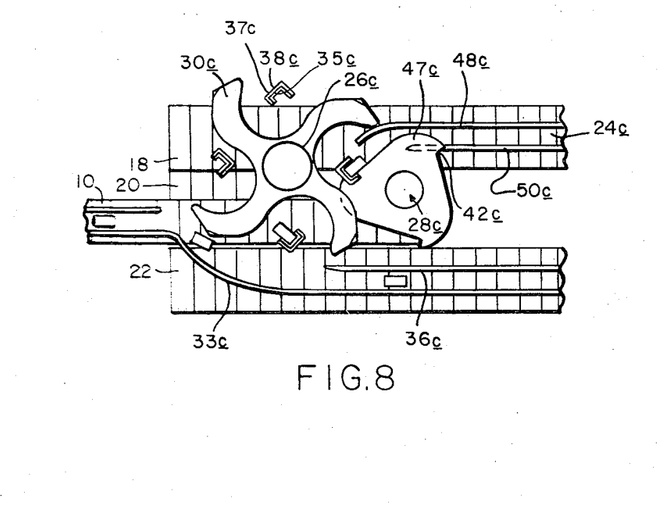
FIG. 8 is a plan view of the apparatus modified to process containers in the form of bottles of rectangular configuration showing the two narrow conveyors, one at the end of each of the discharge conveyors.

A similar variation of the apparatus is shown in FIG. 8 for handling containers in the form of flask-type bottles of rectangular cross-section. The rotor 26c and radial arms 30c correspond very nearly to the rotor and arms shown in FIG. 7. The blunt ends of the arms 30c are provided with inserts 31c similar to those shown in FIG. 12. The arms 38c are channel-shaped and provide relatively deep pockets 35c of rectangular cross-section with one side longer than the other and are provided near their lower ends with a narrow strip 37c of frictional material (FIG. 8). The rotor 28c has arms 47c containing relatively shallow pockets 42c of angular shape designed to engage the narrow sides of the bottles at one corner.

The apparatus thus far described may be employed to divide a single row of containers into two rows and in doing so the containers that are pushed onto the discharge conveyor 22 are not substantially rotated so that they travel along the discharge conveyor 22 with the labeled sides facing outwardly in nearly the same position of orientation that they left the labeling machine. The containers moved onto the discharge conveyor 18, however, are rotated by the combined action of the rotors 26 and 28 approximately 180° so that their labeled sides are disposed outwardly in the reverse of the position in which they left the labeler.

Figure 4:
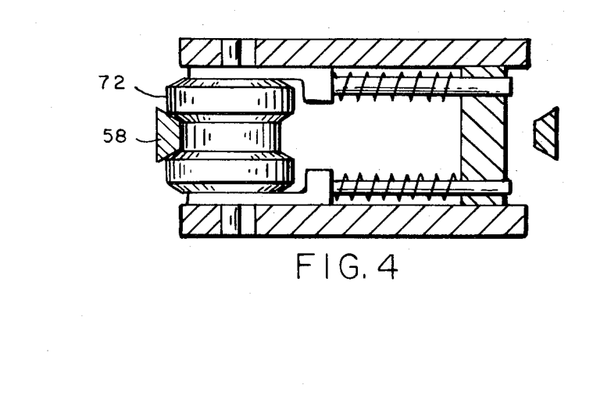
FIG. 4 is a vertical section taken on the line 4—4 of FIG. 3.

Referring to FIG. 3, to provide for passage of the containers from the discharge conveyors 18 and 22 to the inspection conveyor 24, the discharge conveyors 18 and 22 are comprised of spaced parallel runs 18a—18a and 22a—22a and a dead plate 80 is disposed between the runs of each pair at the junction of the discharge conveyors with inspection conveyor 24. Movement of the containers across the dead plates is provided for by the crossover devices 14 which comprise pairs of spaced parallel belts which are adapted to engage the containers as the latter move onto the dead plates and move them therefrom onto the inspection conveyor 24. The cross-over devices as shown in FIG. 3 each comprise an inner endless belt 56 and an outer endless belt 58. The outer endless belts are supported for rotation on longitudinally spaced sheaves 60 and 62 and the inner belts are supported on longitudinally spaced sheaves 66 and 68. The inner sides of the belts 56 and 58 of each pair are supported in spaced parallel relation by longitudinally disposed rollers 70 and 72, the rollers 70 being supported with their inner sides in a substantially straight line between the sheaves 66 and 68, unyieldingly so that the inner sides of the belts 56 travel along straight lines. The belts 58 are supported with portions of their inner sides situated in straight lines parallel to the belts 56 by the rollers 72 and these are yieldably mounted (FIG. 4) so as to permit the inner sides of the belts 58 to yield a limited amount to accommodate variations in the diameters of the containers and also to accommodate protruding spotting members $a$ by means of which the containers were initially spotted. The distance between the inner sides of the belts is less than the diameters of the containers so that the reactive pressure of the displaced belts 58 is enough to prevent the containers from turning freely about their vertical axes as they travel across the dead plates 80.

As herein illustrated (FIG. 3), the sheaves 60 at one end of the outer belts are mounted on fixed shafts and the sheaves 62 at the other end are mounted on shafts supported for longitudinal movement in slots 59 and held spaced from the sheaves 60 by spring means 61 so as to keep the belts taut. The sheaves 60 are driven at a constant speed by means not shown.

Figure 5:
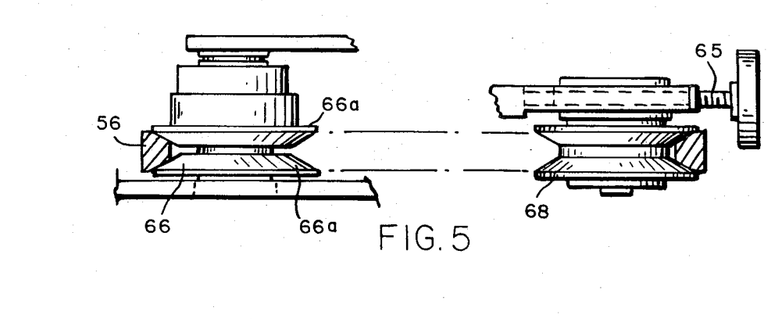
FIG. 5 is an elevation, broken away in part, taken on the line 5—5 of FIG. 3.

Initially, referring to FIGS. 1 and 3, the containers are lined up in the labeling machine for application of labels thereto by spotting means in the labeling machine and spotting members $a$ on the containers which in conjunction orient the containers so that corresponding sides of all of the containers face in the same direction for application of labels to the sides and/or sealing strips to the tops. As shown in FIG. 3, as each container leaves the line conveyor the spotting member $a$ occupies a 12 o'clock position with respect to the perpendicular axis of the container and so the label occupies the 6 o'clock position. The containers thus oriented when intercepted by the arms 30 are rotated about their own axes in a counterclockwise direction and as they move along the arcs the arms travel about the axis of the rotor 26 and through the distance travelled from the line conveyor 10 to the discharge conveyor 22 these containers may be turned from the 12 o'clock position to approximately an 11 o'clock position and so when they are moved onto the inspection conveyor 24 they may occupy the 11 o'clock position. Thus the sides bearing the labels are offset to the right with respect to a line of sight perpendicular to the line of travel of the containers. The containers intercepted by the arms 38 travel in a counterclockwise direction about the axis of the rotor 26 as the arms 38 travel about the axis of the rotor 26 and are also rotated in a clockwise direction about their own axes as the arms 38 rotate about their own axes during such arcuate movement about the axis of the rotor, the net effect of which is to rotate the containers in a clockwise direction from the 12 o'clock position to about a 3 o'clock position at their interception with the arms of the rotor 28. The intercepted containers are then rotated by the arms 47 about their own axes in a clockwise direction as they travel with the arms about the axis of rotation of the rotor 28 so that when they are moved onto the conveyor 24 they may occupy approximately an 8 o'clock position. Thus the labeled sides of the container on the discharge conveyor 18 are offset to the left of a line of sight perpendicular to the line of travel of the containers. To enable ease of inspection it is desirable to effect further rotation of the containers in each of the rows to bring the labeled sides of the containers around to the 6 o'clock and 12 o'clock positions on the inspection conveyor 24 or if there are two narrow inspection conveyors on the respective narrow inspection conveyors thus disposing the labels on the containers centered with respect to a line of sight perpendicular to the movement of the containers. This is achieved in the cross-over devices 14 by providing a variable diameter sheave 66 (FIG. 5) for the belts 56 which may be varied to change the speed of the belts 56 relative to the belts 58 and thus to effect rotation of the containers about their vertical axes while moving along with the inspection conveyor 24 to turn the containers around, respectively, to the 6 and 12 o'clock positions so as to expose the labels at opposite sides of the inspection conveyor 24 symmetrically outward for optimum viewing.

As herein illustrated (FIGS. 3 and 5), the variable diameter sheaves 66 about which the inner belts are entrained at one end are mounted on fixed shafts and the sheaves 68 at the other end are mounted on shafts supported for longitudinal movement in slots 63. The sheaves 68 are provided with means in the form of screws 65 for effecting longitudinal adjustment of their supporting shafts relative to the sheaves 66 so as to tension the belts. The sheaves 66 are of variable pitch having separable spring-loaded halves 66a—66a which will move apart when the tension in the belts is increased a predetermined amount and will move together when the tension is decreased a predetermined amount. Thus by increasing or decreasing the effective diameter of the sheaves 66 the speed of the belts may be increased or decreased so as to obtain a speed differential between the inner and outer belts such as to rotate the containers to bring them into proper position for inspection. The variable pitch sheaves 66 are driven at a predetermined speed by means not shown herein.

When the containers are of non-circular cross-section the belts are driven at the same speed since they function in this case only as means for transferring the containers across the dead plates on the inspection conveyor 24.

Figure 9:
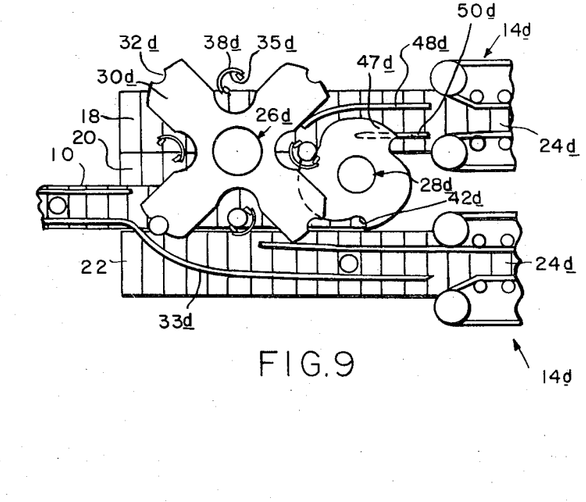
FIG. 9 is a plan view of the apparatus altered to provide for containers in the form of miniature bottles of circular cross-section showing two narrow conveyors, one at the end of each discharge conveyor and provided with cross-over means arranged to function as spotters.

FIG. 6 shows the discharge conveyors 18 and 22 as each having an extension 24a so that the containers move uninterruptedly from the rotors 26a, 28a to the inspection conveyors 24a for inspection. While neither the dead plates nor cross-over plates are required to carry containers away from the rotors 26a, 28a because of the fact that the round containers have a tendency to rotate out of position, it is desirable to provide the cross-over devices 14d, as shown in FIG. 9, with one of the belts of each pair of belts, adjustable to move at a different speed than the other to enable orienting the round containers there shown. In this figure the component parts are the same, as shown in FIG. 6, but labeled with the suffix d.

FIG. 7 shows the discharge conveyors 18 and 22 provided with continuous extensions 24b—24b so that no dead plates are required. Additionally, since the containers are of elliptical cross-section there is no tendency for them to turn as they travel and hence the cross-over devices are omitted since they are not required either for the purpose of carrying the containers onto the inspection conveyors 24b or to effect their orientation. Similarly, FIG. 9 shows a discharge conveyor provided with continuous extensions 24c—24c and since the containers are of rectangular configuration there is no need for the cross-over devices either for the purpose of carrying the containers onto the inspection conveyors 24c or to effect their orientation.

The conveyors 10, 18, 20 and 22 are of the chain link type and as herein illustrated (FIG. 1) the terminal end of the line conveyor 10 is entrained about a toothed wheel 71, the opposite ends of the conveyor 20 are entrained about toothed wheels 73 and 72a and the terminal ends of the discharge conveyors 18 and 22 are entrained about toothed wheels 76. The ends of the inspection conveyor or conveyors 24, if in the form of belts, are entrained about a flat face pulley 78. If the inspection conveyors are of the chain link type they are entrained about tooth wheels.

The rotor 26 (FIG. 1) extends upwardly from the hub 40 through a supporting part of the frame and has fixed to its upper end a gear 82 which meshes with a gear 84 by means of which it is rotated and a spring release 83 connects the gear to the rotor so that in the event of jamming the gear can slip.

The rotor 28 is rotated in a clockwise direction by the shaft 44 to the upper end of which it is fixed. The lower end of the shaft 44 has fixed to it a beveled gear 94 which meshes with a beveled gear 96 which is driven by a gear 97 which meshes with a gear 98. The gears 84 and 98 by means of which rotation of the respective rotors is effected are connected to a suitable source of power not shown herein.

It should be understood that the present disclosure is for the purpose of illustration only and that this invention includes all modifications and equivalents falling within the scope of the appended claims.

I claim:

1. Apparatus for dividing a single row of containers into two rows without interruption of continuous flow of the containers, comprising a line conveyor on which the single row of containers are moving in predetermined direction and at a predetermined speed, a pair of discharge conveyors arranged one at each side of the line conveyor, said discharge conveyors moving at a predetermined lesser speed than the line conveyor, and transfer means moving at speeds intermediate that of the line conveyor and the discharge conveyors comprising first and second means, said first means being operable to move certain of the containers from the line conveyor to one of the discharge conveyors and to guide others to said second means, and said second means being operable to receive containers guided thereto from the first means and move them to the other discharge conveyor, and wherein said second means moves at a faster rate than the first means such that the second means takes the containers away from the first means as the first means guides containers thereto.

2. Apparatus for dividing a single row of containers into two rows, comprising a line conveyor on which the single row of containers are moving in a predetermined direction at a predetermined speed, a pair of discharge conveyors arranged one at each side of the line conveyor, said discharge conveyors moving at a predetermined lesser speed than the line conveyor, and transfer means moving at speeds intermediate that of the line conveyor and the discharge conveyors comprising first and second means, said first means embodying alternate and intermediate parts, said alternate parts being adapted to intercept containers on the line conveyor and move them laterally therefrom onto one of the discharge conveyors, and said intermediate parts being adapted to intercept containers on the line conveyor and guide them therealong to the second means, and said second means being operable to intercept the containers guided thereto by said intermediate parts and move them laterally onto the other of the discharge conveyors, and wherein said second means moves at a faster rate than said intermediate parts.

3. Apparatus for dividing a single row of containers into two rows, comprising a line conveyor on which the single row of containers are moving in a predetermined direction and at a predetermined rate, a pair of discharge conveyors arranged one at each side of the line conveyor, said discharge conveyors moving at a lesser rate than the line conveyor, transfer means comprising first and second rotors embodying radially disposed arms, the arms on said first rotor being alternately long and short and arranged so that the long arms intercept and move containers from the line conveyor onto one of the discharge conveyors and the short arms intercept containers on the line conveyor and guide them therealong to said second rotor, said long and short arms travelling at rates slower than the line conveyor such that the line conveyor holds the containers engaged with said arms as they travel forwardly in the direction of rotation, the arms on the second rotor operating to intercept containers guided thereto by the short arms of the first rotor and move them laterally onto the other discharge conveyor, and wherein the arms of said second rotor move at a faster rate than the short arms of the first rotor.

4. Apparatus for transferring containers from a single row of containers on a line conveyor travelling in a predetermined direction and at a predetermined rate to two other conveyors travelling in the same direction but at a lesser rate, first and second rotors disposed in succession in the direction of movement of the conveyors, said first rotor operating to intercept certain of the containers on the line conveyor and move them laterally therefrom onto one of the other conveyors and to intercept others of the containers on the line conveyor and conduct them therealong to said second rotor, said second rotor operating to intercept the containers delivered thereto from the line conveyor by the first rotor and move them laterally from the line conveyor onto the other conveyor, relative movement of the rotors and line conveyor being such that the line conveyor exerts a force on the containers to hold them engaged with the rotors as they rotate and relative movement of the other conveyors and the rotors being such that the other conveyors exert a force on the containers to move them away from the rotors.

5. Apparatus according to claim 4, comprising means operable while the containers are being moved laterally from the line conveyor to said other conveyor to hold the containers engaged with said second rotor at the rear side of its rotation with respect to the direction of movement of the conveyors.

6. Apparatus according to claim 4, comprising a conveyor situated between the line conveyor and said other conveyor and travelling at the same rate as said other conveyor, operable while the containers are being moved laterally from the line conveyor to said other conveyor to hold the containers engaged with said second rotor at the rear side of its rotation with respect to the direction of movement of the conveyors.

7. Apparatus according to claim 4, comprising guide rails skirting the rotors, said rails extending, respectively, from the near side of the line conveyor at the rear side of the first rotor across the conveyor to the near side thereof and from thence along the near side of said one conveyor to a point of discharge and from the far side of the line conveyor intermediate the rotors across the other conveyor to the far side thereof, and from thence along said other conveyor to a point of discharge.

8. Apparatus according to claim 7, wherein the guide rails are provided with antifriction surfaces.

9. Apparatus for operating on a single row of containers delivered thereto by a line conveyor having a horizontal surface on which the bottoms of the containers rest, comprising a pair of discharge conveyors having surfaces situated in a plane common to that of the line conveyor and with portions of the several conveyors in side-by-side relation such that the containers resting on the line conveyor may be transferred therefrom to one or the other of the discharge conveyors by lateral displacement from the line conveyor, selector means supported above the plane of the conveyors, said selector means comprising alternate and intermediate parts, said alternate parts being operable to intercept alternate containers on the line conveyor and move them onto one of the discharge conveyors and said intermediate parts operating to intercept intermediate containers on the line conveyor, and means operable in conjunction with said intermediate parts to effect lateral movement of the intermediate containers onto the other of the discharge conveyors and to orient said intermediate containers to dispose corresponding sides thereof in predetermined opposite positions such that the containers travel along said discharge conveyors substantially back-to-back.

10. Apparatus according to claim 9, wherein said discharge conveyors extend beyond the selector means in the direction of movement.

11. Apparatus according to claim 9, comprising conveyor means to which the discharge conveyors deliver the containers in two rows for inspection, and means for moving the containers from the discharge conveyors onto the inspection conveyor.

12. Apparatus according to claim 11, wherein said means for moving the containers from the discharge conveyors onto the inspection conveyor is adapted to effect rotation of the containers to dispose the containers in the two rows with the label-bearing side facing outwardly.

13. Apparatus according to claim 9, wherein there is a single broad inspection conveyor adapted to receive from the discharge conveyors the two rows of containers and there are transfer means crossing from one discharge conveyor to the inspection conveyor for moving the containers from discharge conveyors onto the inspection conveyor.

14. Apparatus according to claim 1, wherein each discharge conveyor has an extension along which the containers travel for inspection.

15. Apparatus according to claim 9, comprising conveyor means to which the discharge conveyors deliver the containers in two rows for inspection and means for moving the containers from the discharge conveyors onto the inspection conveyors comprising dead-plates crossing from the ends of the discharge conveyors to the adjacent ends of the inspection conveyor and spaced parallel belts extending from the discharge conveyor onto the inspection conveyor, said belts being movable in the direction of movement of the conveyors and operable to push the containers across said dead-plates.

16. Apparatus according to claim 15, wherein each of the discharge conveyors comprises spaced parallel runs such that at the ends adjacent the inspection conveyor the dead-plates may extend between said run a sufficient distance to insure a smooth transfer of the containers from the discharge conveyors onto the inspection conveyor.

17. Apparatus for transferring containers from a line conveyor to a pair of discharge conveyors arranged with their ends adjacent the line conveyor, one at the far side and the other at the near side, comprising longitudinally disposed, oppositely turning rotors, one of said rotors having parts thereon movable therewith from the far side of the line conveyor transversely across to the near side and the other having parts thereon movable therewith from the near side of the line conveyor transversely across to the far side, certain of the parts on the one rotor operating to intercept a container on the line conveyor and move it to the discharge conveyor at the near side and other of the parts on the one rotor operating to intercept a container on the line conveyor and move it therealong to a position of interception by a part of the other rotor, said intercepted container being moved from its position of interception by said other rotor from the line conveyor to the discharge conveyor at the far side.

18. Apparatus according to claim 17, wherein the discharge conveyors are arranged in spaced parallel relation to each other.

19. Apparatus according to claim 17, wherein the discharge conveyors are arranged with portions thereof extending along each side of the line conveyor in parallel side-by-side relation thereto such that the upper surfaces of the several conveyors lie in a common plane.

20. Apparatus for transferring containers from a line conveyor to a pair of discharge conveyors arranged with their ends adjacent the line conveyor, one at the far side and the other at the near side, comprising longitudinally disposed rotors, radially disposed arms on the two rotors, on the one rotor alternate long and short arms and on the other arms all of the same length, the long arms on said one rotor being movable transversely of the line conveyor from the far side toward the near side and the arms on the other rotor being movable transversely of the line conveyor from the near side toward the far side, said arms having container-receiving recesses of a configuration adapted to embrace the containers, the long arms on the one rotor operating as they move over the line conveyor to intercept containers thereon and move them bodily in an arc onto the discharge conveyor at the near side and the short arms on the one rotor operating as they move over the line conveyor to intercept containers and guide them as they are carried along by the line conveyor to a position of interception by an arm on the other rotor, and said intercepting arms of the other rotor operating to move the intercepted containers bodily from the line conveyor onto the discharge conveyor at the far side.

21. Apparatus according to claim 20, wherein said short arms on the one rotor which present the containers to the arms of the other rotor and said other rotor effect rotation of the containers such that when the containers are moved by said other rotor onto the discharge conveyor at the far side they are substantially reversed with respect to the containers on the discharge conveyor at the near side.

22. Apparatus for transferring containers from a line conveyor to a pair of discharge conveyors arranged with their ends adjacent the line conveyor, one at the far side and the other at the near side, comprising longitudinally disposed rotors, radially disposed arms on the rotors comprising alternate long and short arms on the one rotor and arms all of one length on the other rotor, the arms on the two rotors being movable therewith about the centers of rotation of the rotors, and the short arms on the one rotor being rotatable about the axis of rotation of the one rotor and about axes spaced from and parallel thereto, said long arms of the one rotor operating to intercept containers on the line conveyor and move them along an arc about the axis of rotation of the one rotor onto the discharge conveyor at the near side and said short arms operating to intercept containers on the line conveyor and guide them along an arc about the axis of rotation of the one rotor along the line conveyor and simultaneously to rotate them during such movement along the line conveyor about axes parallel to the axis of the one rotor and said intercepting arms on the other rotor operating to move the intercepted containers from the line conveyor along an arc about the axis of rotation of the other rotor onto the discharge conveyor at the far side.

23. Apparatus according to claim 20, wherein the container-receiving recesses at the end of the long arms are provided with spaced blocks of material having a relatively high coefficient of friction and are absorbent of shock without rebound.

24. Apparatus according to claim 17, wherein said one rotor comprises a part supported for rotation about a vertical axis, said part embodying a hub rotatable therewith, a plurality of peripherally spaced, radially extending long arms fixed to the part and a plurality of peripherally spaced short arms mounted on the hub around the part between the long arms, said short arms being rotatable about axes spaced from and parallel to the axis of rotation of the part.

25. Apparatus according to claim 24, comprising planetary gearing rotatably connecting the parts of the short arms such that rotation of the rotor in a counterclockwise direction effects rotation of the short arms in the opposite direction.

26. Apparatus according to claim 17, wherein said one rotor comprises a part supported for rotation about a vertical axis, said part embodying a hub, a plurality of peripherally spacdd, radially fixed long arms on the part and a plurality of vertically elongate short arms supported by the hub in radially spaced relation to the axis of rotation of the part for rotation about axes parallel to the axis of the part, each short arm extending above and below the long arms and there being one short arm between each successive pair of long arms.

27. Apparatus according to claim 17, comprising means having a relatively high coefficient of friction fastened to said long and short arms to frictionally resist rotation of the containers relative thereto and to absorb the shock of contact without rebound.

28. Apparatus according to claim 27, wherein the container-receiving recesses at the ends of the long arms are arcuate and the blocks of frictional material are disposed approximately 120° apart.

29. Apparatus according to claim 27, wherein the blocks at the leading sides of the recesses of the longer arms are larger than those at the trailing sides and the exposed sides, one flat, as contrasted to the blocks at the trailing sides which are cylindrical.

30. Apparatus according to claim 27, wherein the container-receiving recesses of the short arms are arcuate and vertically elongate and are provided near their lower ends with strips of frictional material which absorb shock.

31. Apparatus for transferring containers from a line conveyor to a pair of discharge conveyors arranged with their ends adjacent the line conveyor, one at the far side and the other at the near side, comprising longitudinally disposed rotors, radially disposed arms on the rotors comprising alternate long and short arms on the one rotor and arms all of one length on the other rotor, the arms on the two rotors being movable therewith about the centers of rotation of the rotors and the short arms on the one rotor being rotatable about the axis of rotation of the one rotor and about axes spaced from and parallel thereto, said long arms of the one rotor operating to intercept containers on the line conveyor and move them along an arc about the axis of rotation of the one rotor onto the discharge conveyor at the near side, and said short arms operating to intercept the containers on the line conveyor and guide them along an arc about the axes of rotation of the one rotor along the line conveyor and simultaneously to rotate them during such movement along the line conveyor about axes parallel to the axis of the one rotor, and said intercepting arms on the other rotor operating to move the intercepted containers from the line conveyor along an arc about the axis of rotation of the other rotor onto the discharge conveyor to the far side, said long arms having blunt ends designed to push the containers from the line conveyor onto the discharge conveyor at the near side and having inserts of frictional shock-absorbent material set into the blunt end thereof at the leading side for making initial contact with the containers.

32. Apparatus according to claim 31, wherein the inserts at the blunt ends of the long arms are set into the ends at the intersection of the ends and their leading sides, the exposed surfaces of the inserts corresponding to the profile of the arms at the corners.

33. Apparatus according to claim 20, wherein the arms of said other rotor contain arcuate recesses situated at the leading sides of the arm in the direction of rotation and blocks of frictional material set into the arm at the opposite sides of the recesses adjacent the roots and tips of the arms, the blocks at the roots being larger than the blocks at the tips.

34. Apparatus according to claim 33, wherein the exposed sides of the blocks at the roots are flat and exposed sides of the blocks at the tips are cylindrical.

35. Apparatus according to claim 20, wherein the short arms are of polygonal section and are provide near their lower ends with frictional shock-absorbent material.

36. Apparatus according to claim 20, wherein the short arms are of rectangular section and are provided near their lower ends with frictional shock-absorbent material.

37. Apparatus according to claim 17, comprising guide members mounted at the outer sides of the discharge conveyors at the near and far sides.

38. Apparatus according to claim 17, comprising means forming a passage along each of the discharge conveyors at the near and far sides into which the containers are delivered by said rotors with corresponding sides of the containers facing outwardly.

39. Apparatus according to claim 11, wherein said means for moving the containers from the discharge conveyor onto the inspection conveyor comprise spaced parallel endless belts extending from the discharge conveyor to the inspection conveyor and from passages along which the containers are adapted to be moved by engagement of the belts therewith, and means for effecting movement of the belts of each pair of belts to move the containers from the discharge conveyors onto the inspection conveyor.

40. Apparatus according to claim 39, wherein the endless belts of each pair have spaced parallel runs adapted to engage the sides of the containers moving therealong and there is means yieldably supporting the run of one of the belts of each pair relative to the run of the other belt to accommodate minor variations in container size and to yield sufficiently when the containers are properly oriented to allow for the spotting member.

41. Apparatus according to claim 39, wherein there are longitudinally spaced sheaves supporting the ends of the outer belts, one of which is mounted on a fixed shaft and the other of which is mounted on a shaft movable longitudinally with respect to the one sheave, and there is spring means yieldably holding said other sheave spaced from the one sheave at a distance to maintain the belts taut.

42. Apparatus according to claim 39, wherein there are longitudinally spaced sheaves supporting the inner belts, the sheaves at one end being mounted on fixed shafts and the sheaves at the other end being mounted on movable shafts, said sheaves at the one end comprising yieldably separable halves, and means for effecting adjustment of the sheaves at the other end relatively to the sheaves at the one end to increase or decrease the effective diameters of the sheaves at the one end.

43. Apparatus according to claim 1, comprising inspection conveyor means associated with said discharge conveyors to which said discharge conveyors deliver the two rows of containers with all of the containers in one row facing in the same direction but in the two rows facing in opposite directions.

44. Apparatus according to claim 32, wherein said inspection conveyor means comprises a single broad conveyor arranged with an end adjacent the discharge ends of said discharge conveyors such that said discharge conveyors move the containers onto the single inspection conveyor in two spaced parallel single rows.

45. Apparatus according to claim 1, wherein said inspection conveyor means comprise extensions of the discharge conveyors on which the containers travel away from the rotor in spaced parallel single rows.

46. Apparatus according to claim 44, wherein there are dead-plates extending from the ends of the discharge conveyors across to the inspection conveyor and there are transfer devices for moving the containers from the discharge conveyors across the deadplates onto the inspection conveyor.

47. Apparatus according to claim 46, wherein said transfer devices are operable to rotate the containers about their vertical axes to effect orientation thereof.

48. Apparatus according to claim 45, wherein there are devices situated along the opposite sides of the extensions of the discharge conveyors operable to rotate the containers about their vertical axes to effect orientation thereof.

* * * * *